United States Patent
Hay et al.

(10) Patent No.: US 6,531,871 B1
(45) Date of Patent: Mar. 11, 2003

(54) EXTENSION ASSEMBLY FOR AN ELECTROMAGNETIC ANTENNA AND METHOD OF CONNECTION

(75) Inventors: Richard Thomas Hay, Edmonton (CA); Byron John Sand, Sherwood Park (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/697,128

(22) Filed: Oct. 27, 2000

Related U.S. Application Data

(60) Provisional application No. 60/162,221, filed on Oct. 29, 1999.

(51) Int. Cl.[7] .................................................. G01V 3/08

(52) U.S. Cl. ...................... 324/338; 340/854.6; 175/40

(58) Field of Search ............................... 324/338, 339, 324/356, 369; 340/854.6, 854.8, 854.4; 175/40, 50; 166/250.01, 254.2

(56) References Cited

U.S. PATENT DOCUMENTS

| | | | |
|---|---|---|---|
| 4,126,848 A | * 11/1978 | Denison | .................. 340/854.6 |
| 4,496,174 A | 1/1985 | McDonald et al. | |
| 4,691,203 A | 9/1987 | Rubin et al. | |
| 5,160,925 A | 11/1992 | Dailey et al. | |
| 5,883,516 A | 3/1999 | Van Steenwyk et al. | |

OTHER PUBLICATIONS

Sperry–Sun Drilling Services "Sourcebook" dated 1996, pages 33 and 38.

United GeoCom Drilling Services, Computalog.com website information entitled "Geoservices Electromagnetic MWD" (3 pages).

United GeoCom Drilling Services, Computalog.com website information entitled "Extended Range Electromagnetic MWD System" (2 pages).

* cited by examiner

*Primary Examiner*—Walter E. Snow
(74) *Attorney, Agent, or Firm*—Terrence N. Kuharchuk; William Shull; Michael D. McCully

(57) ABSTRACT

An electromagnetic antenna extension assembly for connection downhole into a pipe string between a data transmission unit and an electromagnetic antenna. Further, a method for connecting the data transmission unit with the antenna utilizing the assembly. The antenna includes an outer antenna member and an inner antenna member having a lower electrical connector. The data transmission unit includes an outer transmission member and an inner data transmission tool having an upper electrical connector connectable with the lower connector of the inner antenna member. The assembly includes at least one extension tool comprised of: a conductive outer extension member having an upper end connectable with the outer antenna member and a lower end connectable with the outer transmission member; and a conductive inner extension member within the outer extension member and having an upper end connectable with the lower connector of the inner antenna member and a lower end connectable with the upper connector of the inner data transmission tool, such that the electromagnetic signal is communicable between the data transmission unit and the antenna.

32 Claims, 2 Drawing Sheets

EXTENSION ASSEMBLY FOR AN ELECTROMAGNETIC ANTENNA AND METHOD OF CONNECTION

This application claims the benefit of No. 60/162,221 filed Oct. 29, 1999.

FIELD OF INVENTION

The within invention is directed a method and an electromagnetic antenna extension assembly, including at least one extension tool, for extending a downhole electromagnetic antenna providing or transmitting data, such as measurement-while-drilling telemetry data, to the surface. More particularly, the electromagnetic antenna is extended by extending the length of a lower electrode of the electromagnetic antenna such that the electromagnetic signal transmitted by the antenna is propagated or launched into the surrounding casing and/or the formation closer to the surface. Preferably, the method and the assembly provide for the extension of the antenna, and particularly the lower electrode, by providing for the connection of one or more extension tools into a pipe string, such as a drill string, downhole of the antenna.

BACKGROUND OF INVENTION

For many parts of the world there are hydrocarbon producing zones that need to be drilled underbalanced or near balance making use of aerated drilling mud, or 2 phase or air drilling applications. In these instances, electromagnetic ("EM") data transmitters or transmission units, such as EM measurement-while-drilling ("MWD") systems, are used as they do not rely on pressure pulses through a continuous mud or fluid column to transmit telemetry data to the surface. Rather, the telemetry data is transmitted to the surface using a downhole transmitter antenna which produces EM waves into the formation that are picked up by a receiving antenna array located at the ground surface or sea floor and the wellhead. Specifically, EM MWD systems create an alternating current circuit with the drill string as one conductor and the earth or surrounding formation as the other conductor.

More particularly, in these systems, telemetry data is input from a downhole data transmission unit, including a data transmission tool such as an EM MWD tool, located adjacent or in proximity to the drilling bit or other bottom hole equipment, to an electromagnetic antenna such as an EM MWD antenna positioned downhole in the drill string. The EM antenna transmits the electromagnetic signal, which is detected at the surface.

The downhole data transmission tool or EM MWD tool, which senses and provides the telemetry data or information signals, is typically housed or contained within an outer transmission sub or member, such as an index or hang off sub. The EM MWD tool is held or supported within the index sub, such as by a hang off ring mounted or connected with the index sub. The hang off ring also acts as a lower electrode contact ring. A lower or downhole end of the index sub is connected with the drill bit or other equipment comprising the bottom hole assembly. An upper or uphole end of the index sub is typically connected with the EM antenna.

The EM MWD antenna is typically comprised of an outer antenna sub or member having an upper portion and a lower portion separated by an electrically insulative gap. Further, the EM antenna is typically comprised of an electrically conductive inner antenna member, being a wireline or cable, hung off the EM antenna and extending downhole for connection with the EM MWD tool. More particularly, an upper end of the EM antenna wireline connects with the upper portion of the EM outer antenna sub or member above the insulative gap. A lower end of the EM antenna wireline is comprised of a connector, preferably comprised of a collet overshot, for connection with the EM MWD tool. Specifically, the upper end of the EM MWD tool provides a connector compatible with the EM antenna wireline connector, preferably a contact stinger or probe. The EM antenna wireline is preferably insulated so if it contacts the inside of the outer antenna sub or member or any other portion of the pipe or drill string it will not short out the electromagnetic signal.

As a result of the above configuration of the EM antenna and the EM MWD tool, the upper portion of the outer antenna sub or member and the uphole part or portion of the drill string to the surface provide the upper electrode of the EM antenna. Further, the lower portion of the outer antenna sub or member and the downhole part or portion of the drill string to the drill bit provide the lower electrode of the EM antenna.

However, the propagation of EM waves by the EM antenna is characterized by an increase in attenuation with an increase in distance or an increase in the depth of the EM antenna. Thus, for many of the above-described zones it is difficult or impossible to drill with a conventional EM MWD system as the range required is too far for the telemetry to work in a satisfactory manner. The primary problem is the depth at which the intermediate casing must be set at prior to entering the underbalanced zone. Since the transmitted EM signal tends to be relatively greatly attenuated by approximately 20 dB in relative signal strength when the EM antenna is inside the casing, the maximum depth of the EM antenna tends to be limited to much shallower depths than it would be if positioned within an uncased borehole. The depths of some of these zones cause the EM signal to be greatly attenuated by the time it reaches the surface and thus the signal can not typically be detected by the surface receiver system.

To address the effects of attenuation, a repeater may be used to relay the EM signal uphole. However, where a repeater is used, the repeater tends to be relatively ineffective or less effective until it exits the intermediate casing as a result of the signal loss, being in the magnitude of about a 20 dB signal loss as discussed above. If the repeater can be located close to the surface it can be detected by the surface receiver system but the repeater may not be able to receive the signal from the lower repeaters or the main bottom hole transmitter as it is typically too far away. Adding repeaters solves the problem by having many repeaters at short distances but this solution affects the reliability of the system, adds a large capital and operating cost, and results in a decrease in the signal data rate. For instance, the data rate has been found to be halved for every repeater added, i.e. 3 repeaters would mean the signal data rate can be no faster than 1/8th of the fundamental data rate. All these options are unattractive.

A relatively more attractive option or alternative approach is to add an extension to the EM antenna which allows the first or lowermost EM antenna to be positioned much further up the drill string before launching the signal into the casing and/or the formation. More particularly, a further or additional section or length of drillpipe, referred to herein as the "lengthening section", may be connected into the drill string in-between the lower portion of the outer antenna sub or member and the outer transmission member or index sub housing the EM MWD tool. In other words, the lower portion of the outer antenna sub or member is comprised of the lengthening section. Thus, the lengthening section of drillpipe forms a part of the lower electrode of the EM antenna. The resulting lengthened lower electrode moves or positions the launching point of the EM signal much further uphole. In this instance, the length of the conductive inner antenna member, being the EM antenna wireline, is also increased so that the EM antenna wireline, being a single section or length of wireline or cable, can extend substantially from the upper portion of the outer antenna sub or member, through the lower portion of the outer antenna sub or member including the lengthening section, for connection with the EM MWD tool.

This approach has various advantages and disadvantages. The key advantage is that the lower electrode of the EM antenna may be greatly lengthened or extended by this lengthening section of drillpipe which allows for a stronger signal to be generated. Also the EM antenna is moved closer to the surface making detection of the electromagnetic signal at the surface relatively easier. Typically these lengthening sections can be from 100 feet to thousands of feet or more.

The key limitation with respect to extending the EM antenna by the use of a lengthening section is the length of the EM antenna wireline required to be used. Specifically, the maximum length of the wireline of the EM antenna is limited by the angle or inclination of the borehole being drilled. For instance, the angle of the borehole typically builds with depth, which tends to interfere with the ability of the collet overshot at the lower end of the EM antenna wireline to correctly connect with the contact stinger of the EM MWD tool. Thus, the length of the lengthening section that may be added to the outer antenna sub or member of the EM antenna will be limited by the distance that can be traversed with a single section of wireline or cable, which is dependent upon the borehole. In some instances this limitation prevents a length of drillpipe from being installed that is long enough to appropriately or satisfactorily extend the EM antenna to meet the needs of the telemetry.

Thus, there remains a need in the industry for an improved method and a downhole assembly or tool for extending a downhole EM antenna, and specifically for extending a lower electrode of the EM antenna, thus permitting the placement of the EM antenna closer to the surface. Further, there remains a need in the industry for an EM antenna extension assembly for connection into a drill string between a downhole EM data transmission unit, such as an EM MWD system, and a downhole EM transmitter antenna. As well, there is a need for a method for connecting the downhole data transmission unit with the downhole EM antenna such that the EM antenna is extended thereby.

SUMMARY OF INVENTION

The within invention is directed at a method and an assembly or a tool which take the upper electrode of the EM antenna and move it to a point or location downhole nearer the surface through the use of an extension assembly comprised of at least one extension tool including an electrically conductive inner member, such as a wireline, cable or any other suitable electrical conductor that is positioned inside an electrically conductive outer member, such as a pipe, including a drill pipe, or a coil tubing string.

Further, the within invention is directed a method and an assembly or tool for extending a downhole EM antenna providing downhole data, such as EM MWD telemetry data, or EM signals to the surface. Preferably, the EM antenna is extended by moving the EM antenna closer to the surface within the borehole. More preferably, the extension method, the EM antenna extension assembly or one or more extension tools provide for the lengthening of the lower electrode of the EM antenna such that the EM signal is launched or transmitted into the casing and/or the formation by the EM antenna further uphole or closer to the surface. In the preferred embodiment, the extension method and extension assembly lengthen the lower electrode of the EM antenna by connecting one or more extension tools into a pipe string, such as a drill string, between the EM antenna and the EM MWD tool.

In a first aspect of the invention, the invention is comprised of an electromagnetic antenna extension assembly for connection into a pipe string between a downhole data transmission unit for generating an electromagnetic signal and a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the electromagnetic antenna extension assembly comprising at least one extension tool comprised of:

(a) an electrically conductive outer extension member having an upper end connectable with the outer antenna member and a lower end connectable with the outer transmission member; and (b) an electrically conductive inner extension member mounted and extending within the outer extension member and having an upper end connectable with the lower connector of the inner antenna member and a lower end connectable with the upper connector of the inner data transmission tool;

such that the electromagnetic signal is communicable between the downhole data transmission unit and the downhole electromagnetic antenna.

More particularly, each extension tool is comprised of a tubular electrically conductive outer member or sleeve and an electrically conductive inner member which is preferably electrically insulated from the outer member. Specifically, the outer extension member is electrically insulated from the inner extension member. More particularly, the outer extension member has an inner surface and the inner extension member has an outer surface. The inner surface may be a spaced distance from the outer surface to provide an electrically insulative gap therebetween. Preferably, the extension tool is further comprised of an insulator between the inner surface of the outer extension member and the outer surface of the inner extension member for electrically insulating the outer extension member from the inner extension member.

Any type of electrical insulator or electrically insulative material may be used which is capable of electrically insulating the inner extension member from the outer extension member. Further, the insulator may be positioned within the gap provided by the spaced distance between the adjacent inner and outer surfaces of the outer and inner extension members respectively. As well, the insulator may be associated, mounted or connected with one or both of the inner and outer surfaces. Preferably, the insulator is comprised of an insulative coating associated with at least one of the outer surface of the inner extension member and the inner surface of the outer extension member. Thus, the inner surface of the outer extension member may be comprised of the insulative coating. However, in the preferred embodiment, the outer surface of the inner extension member is comprised of the insulative coating.

As stated, the electrically conductive outer extension member has an upper end connectable with the outer antenna member and a lower end connectable with the outer transmission member such that the electromagnetic signal is communicable between the outer antenna member and the outer transmission member. Thus, the upper end of the outer extension member is adapted or configured to be compatible for attachment or connection, either permanently or detachably, in series with the outer antenna member. Although any compatible configuration may be used, the outer antenna member is preferably comprised of a threaded pin or male connector, while the upper end of the outer extension member is comprised of a compatible threaded box or female connector for receipt of the male connector therein.

Similarly, the lower end of the outer extension member is adapted or configured to be compatible for attachment or connection, either permanently or detachably, in series with the outer transmission member. Although any compatible configuration may be used, the outer transmission member is preferably comprised of a threaded box or female connector, while the lower end of the outer extension member is comprised of a compatible threaded pin or male connector for receipt within the female connector.

The outer extension member may be comprised a single, unitary tubular portion, sub or sleeve extending between its upper and lower ends. Alternately, the outer extension member may be comprised of two or more tubular sections, portions, subs or sleeves interconnected to provide the outer extension member having the upper and lower ends. Where two or more sections are interconnected, the sections may be connected, affixed, mounted or otherwise joined together in series, permanently or detachably, in any manner and by any suitable mechanism for connecting the adjacent ends of each such section such that the outer extension member formed thereby is electrically conductive between its upper and lower ends. Preferably, a detachable connection, such as a threaded box and pin connection, is provided between adjacent sections comprising the outer extension member.

In the preferred embodiment, the conductive outer extension member is comprised of a top section, which may also be referred to as an extender sub, defining the upper end of the outer extension member connected with a bottom section defining the lower end of the outer extension member. Each of the top and bottom sections may be comprised of one or more tubular portions, subs or sleeves interconnected to provide the respective section. However, preferably, the top section is comprised of a single, unitary tubular portion, sub or sleeve connected with the bottom section. The bottom section may connected, mounted, affixed or otherwise joined with the top section in any manner and by any structure, mechanism or device, but is preferably connected by a threaded connection therebetween. Further, the bottom section is preferably comprised of two or more tubular portions, subs or sleeves connected together in series. Preferably, the overall length of the extension tool, and particularly the conductive outer extension member, is varied by varying the length of the bottom section.

Preferably, the outer extension member is comprised of at least one length, joint or section of pipe, for example a drill pipe, or at least one length or section of coiled tubing. Further, in the preferred embodiment, each of the top section and the bottom section is comprised of at least one length of pipe or at least one length of coiled tubing.

As indicated, the extension tool is connected into the pipe string between the subdownhole data transmission unit and the downhole electromagnetic antenna. Thus, the outer extension member is connected between the outer antenna member and the outer transmission member. As discussed above, a further or additional section or length of pipe, referred to as a lengthening section may be connected with the lowermost end or lower portion of the outer antenna member. Accordingly, the outer antenna member, and particularly its lower portion, is comprised of the lengthening section. In this case, the upper end of the outer extension member is particularly connectable with the lengthening section. In any event, the extension tool is connected into the pipe string such that the conductive outer extension member forms a part of the lower electrode of the EM antenna.

The outer extension member of the extension tool, and thus the extension tool itself, may be of any length, subject to the limitations set out below. However, in the event that the length of any particular extension tool is limited, two or more extension tools may be used to extend the EM antenna by lengthening the lower electrode. Specifically, two or more of the extension tools may be combined and connected into the pipe string between the EM antenna and the data transmission unit to provide the desired distance or length therebetween.

Further, each extension tool is comprised of the electrically conductive inner extension member which extends within the electrically conductive outer extension member and is mounted, connected or otherwise affixed within the inner surface of the outer extension member while preferably electrically insulating the signal path of the inner extension member from the outer extension member. The conductive inner extension member may be mounted, connected or affixed within the outer extension member or held in position within the outer extension member by any mechanism, device, structure or method capable of and suitable for maintaining the position of the inner extension member therein. In the preferred embodiment, the inner extension member is mounted, connected or held within the outer extension member, preferably within the top section thereof. More particularly, the upper end of the inner extension member is mounted within the top section of the outer extension member.

The conductive inner extension member has an upper end and a lower end. The upper end of the conductive inner extension member is adapted or configured to be compatible for connection with the conductive inner member of the EM antenna, particularly the lower connector of the inner antenna member. Similarly, the lower end of the conductive inner extension member is adapted or configured to be compatible for connection with the inner data transmission tool, particularly the upper connector thereof.

The upper end of the inner extension member is preferably comprised of an upper electrical connector or fastener compatible with the lower connector of the inner antenna member of the EM antenna for connection therewith. Similarly, the lower end of the inner extension member is preferably comprised of a lower electrical connector or fastener compatible with the upper connector of the inner data transmission tool for connection therewith.

Although any compatible electrical upper and lower connectors may be used, preferably, each of the lower connector of the inner antenna member and the lower connector of the inner extension member is comprised of a female connector and each of the upper connector of the inner extension member and the upper connector of the inner data transmission tool is comprised of a compatible male connector for insertion in the female connector. Further, although any compatible male—female connectors may be used, each female connector is preferably comprised of a collet overshot while each male connector is preferably comprised of a contact stinger or probe for insertion within the collet overshot. Thus, in the preferred embodiment, each of the lower connector of the inner antenna member and the lower connector of the inner extension member is comprised of a collet overshot, while each of the upper connector of the inner extension member and the upper connector of the inner data transmission tool is comprised of a compatible contact stinger or probe.

In addition, the extension tool may be further comprised of at least one centralizer associated with the inner extension member for centralizing the inner extension member within the outer extension member. In the preferred embodiment, at least one centralizer is associated with the lower end of the inner extension member.

The conductive inner extension member is preferably comprised of a unitary member or single piece or length extending between its upper and lower ends, although two or more members, pieces or lengths may be connected, attached or affixed together where necessary to provide the conductive inner extension member. Further, the conductive inner extension member may be comprised of any conductive material. For instance, the inner extension member may be comprised of a wireline, a length of coiled tubing or at least one length, portion or joint, and preferably multiple joints, of pipe or tubing such as production tubing. In this case, the tubing such as the production tubing is preferably at least partially electrically insulated from the outer extension member.

However, the inner extension member is preferably comprised of a wireline or cable. In this case, the wireline or cable is preferably insulated from the inner surface of the conductive outer extension member. Thus, an insulated wire or cable, or a wireline having an insulative coating or an insulating jacket on the outer surface thereof, may be used. Alternately, the inner surface of the outer extension member may be coated with an insulator or provided with an insulative coating and a bare or uninsulated wireline or cable used therein.

Alternatively, the conductive inner extension member may be comprised of a length of coil tubing. In this case, the coil tubing is also preferably insulated from the inner surface of the outer extension member. Thus, an insulated coil tubing, or a length of coiled tubing having an insulative coating, may be used or alternately, the inner surface of the outer extension member may be provided with an insulative coating and a bare or uninsulated length of coil tubing used therein.

Further, in the preferred embodiment, the extension tool may be likened to a coaxial cable in which the outer conductor is the pipe or coil tubing and the inner conductor is a preferably insulated conductive wireline cable.

The length of the conductive inner extension member may be limited by the inclination of the borehole, which will in turn limit the overall length of the extension tool. However, as discussed below, two or more extension tools may be combined or connected together to provide the desired extension length. Thus, although the length of each individual extension tool may be limited, the overall length of the desired extension of the EM antenna and the desired length of the lower electrode of the EM antenna, may still be achieved.

As stated, the electromagnetic antenna extension assembly may be comprised of at least two extension tools connected in series. As discussed below with respect to the method of the within invention, in this case, the EM antenna extension assembly is comprised of a first extension tool and at least one second extension tool. In the preferred embodiment, the first extension tool and each second extension tool are substantially similar with respect to the structure and configuration of the elements comprising the tool. Each extension tool may however differ with respect to the overall length of the tool. Thus, each of the first extension tool and the second extension tool are as described above for the preferred embodiment of the invention in its first aspect.

Where the electromagnetic antenna extension assembly is comprised of at least two extension tools connected in series, the lower end of the outer extension member is further connectable with the upper end of an adjacent outer extension member and the lower end of the inner extension member is further connectable with the upper end of an adjacent inner extension member such that the electromagnetic signal is communicable between the downhole data transmission unit and the downhole electromagnetic antenna.

In other words, in order that one or more extension tools may be used as desired or required for any particular application, including any drilling application, the upper end of the outer extension member of each extension tool is preferably connectable with both the outer antenna member and the lower end of an adjacent outer extension member, as necessary, and the lower end of the outer extension member of each extension tool is preferably connectable with both the outer transmission unit and the upper end of an adjacent outer extension member, as necessary. Thus, each outer extension member may be connected into the antenna extension assembly at any position or location along the length of the assembly.

In the preferred embodiment, this connectability is provided by a threaded connection between each adjacent end. More particularly, each of the outer antenna member and the lower end of the outer extension member is comprised of a threaded pin or male connector, while each of the outer transmission member and the upper end of the outer extension member is comprised of a compatible threaded box or female connector for receipt of the male connector therein.

Similarly, in order that one or more extension tools may be used as desired or required for any application, including any drilling application, the upper end of the inner extension member of each extension tool is also preferably connectable with both the lower connector of the inner antenna member and the lower end of an adjacent inner extension member, as necessary, and the lower end of the inner extension member of each extension tool is preferably connectable with both the upper connector of the inner data transmission tool and the upper end of an adjacent inner extension member, as necessary. Thus, each inner extension member may be connected into the antenna extension assembly at any position or location along the length of the assembly.

In the preferred embodiment, as discussed above, this connectability is provided by an electrical connector at each adjacent end. The upper end of the inner extension member is comprised of the upper electrical connector and the lower end of the inner extension member is comprised of the lower electrical connector, both as previously described. The upper electrical connector of the inner extension member is compatible for connection with both the lower connector of the inner antenna member and the lower connector of an adjacent inner extension member, as necessary, while the lower electrical connector of the inner extension member is compatible for connection with both the upper connector of the inner data transmission tool and the upper connector of an adjacent inner extension member, as necessary.

More particularly, in the preferred embodiment, each of the lower connector of the inner antenna member and the lower connector of the inner extension member is comprised of a female connector, preferably a collet overshot. Further, each of the upper connector of the inner extension member and the upper connector of the inner data transmission tool is comprised of a compatible male connector, preferably a contact stinger or probe, for insertion in the female connector.

In a second aspect of the invention, the invention is comprised of a method for connecting a downhole data transmission unit for generating an electromagnetic signal with a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the method comprising the steps of:

(a) providing an electromagnetic antenna extension assembly comprising at least one extension tool, wherein the extension tool is comprised of an electrically conductive outer extension member having an upper end and a lower end and an electrically conductive inner extension member having an upper electrical connector and a lower electrical connector;

(b) connecting the lower end of the outer extension member with the outer transmission member;

(c) inserting the inner extension member within the outer extension member such that the lower connector of the inner extension member is connected with the upper connector of the inner data transmission tool;

(d) connecting the outer antenna member with the upper end of the outer extension member;

(e) inserting the inner antenna member within the outer antenna member such that the lower connector of the inner antenna member is connected with the upper connector of the inner extension member.

Although the method described herein may be performed using any compatible electromagnetic antenna extension assembly, the within method is preferably performed utilizing the EM antenna extension assembly, and preferably the preferred embodiment thereof, as described herein.

Thus, as described above, the outer extension member is comprised of a top section and a bottom section and the upper connector of the inner extension member is mounted within the top section. In this instance, step (b) of the method is comprised of connecting the bottom section defining the lower end with the outer transmission member and step (c) of the method is comprised of inserting the inner extension member within the bottom section of the outer extension member such that the lower connector of the inner extension member is connected with the upper connector of the inner data transmission tool and connecting the top section with the bottom section of the outer extension member. Further, where the bottom section of the outer extension member is comprised of greater than one length of pipe or coiled tubing, step (b) of the method is preferably further comprised of connecting each length of pipe or coiled tubing in series to provide the bottom section.

In a third aspect of the invention, the invention is comprised of a method for connecting a downhole data transmission unit for generating an electromagnetic signal with a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the method comprising the steps of:

(a) providing an electromagnetic antenna extension assembly comprising a first extension tool and at least one second extension tool, wherein each extension tool is comprised of an electrically conductive outer extension member having an upper end and a lower end and an electrically conductive inner extension member having an upper electrical connector and a lower electrical connector;

(b) connecting the lower end of the outer extension member of the first extension tool with the outer transmission member;

(c) inserting the inner extension member of the first extension tool within the outer extension member of the first extension tool such that the lower connector of the inner extension member of the first extension tool is connected with the upper connector of the inner data transmission tool;

(d) connecting the lower end of the outer extension member of the second extension tool with the upper end of the outer extension member of the first extension tool;

(e) inserting the inner extension member of the second extension tool within the outer extension member of the second extension tool such that the lower connector of the inner extension member of the second extension tool is connected with the upper connector of the inner extension member of the first extension tool;

(f) connecting the outer antenna member with the upper end of the outer extension member of the second extension tool; and (g) inserting the inner antenna member within the outer antenna member such that the lower connector of the inner antenna member is connected with the upper connector of the inner extension member of the second extension tool.

Further, the method preferably comprises the steps prior to step (f) of:

(h) connecting the lower end of the outer extension member of at least one further second extension tool with the upper end of the outer extension member of the prior second extension tool;

(i) inserting the inner extension member of the further second extension tool within the outer extension member of the further second extension tool such that the lower connector of the inner extension member of the further second extension tool is connected with the upper connector of the inner extension member of the prior second extension tool;

wherein steps (f) and (g) connect the electromagnetic antenna with the uppermost further second extension tool.

Again, the within method is preferably performed utilizing the EM antenna extension assembly, and preferably the preferred embodiment thereof, as described herein. Specifically, the outer extension member of each extension tool is preferably comprised of a top section and a bottom section and the upper connector of the inner extension member is mounted within the top section. In this instance, in the third aspect of the invention, step (b) of the method is comprised of connecting the bottom section defining the lower end of the outer extension member of the first extension tool with the outer transmission member and step (c) of the method is comprised of inserting the inner extension member of the first extension tool within the bottom section of the outer extension member of the first extension tool such that the lower connector of the inner extension member is connected with the upper connector of the inner data transmission tool and connecting the top section with the bottom section of the outer extension member of the first extension tool.

Where the bottom section of the outer extension member of the first extension tool is comprised of greater than one length of pipe or coiled tubing, step (b) of the method is further comprised of connecting each length of pipe or coiled tubing in series to provide the bottom section.

Further, step (d) of the method is preferably comprised of connecting the bottom section defining the lower end of the outer extension member of the second extension tool with the upper end of the outer extension member of the first extension tool and step (e) of the method is preferably comprised of inserting the inner extension member of the second extension tool within the bottom section of the outer extension member of the second extension tool such that the lower connector of the inner extension member of the second tool is connected with the upper connector of the inner extension member of the first extension tool and connecting the top section with the bottom section of the outer extension member of the second extension tool.

Where the bottom section of the outer extension member of the second extension tool is comprised of greater than one length of pipe or coiled tubing, step (d) of the method is further comprised of connecting each length of pipe or coiled tubing in series to provide the bottom section.

BRIEF DESCRIPTION OF DRAWINGS

Embodiments of the invention will now be described with reference to the accompanying drawings, in which.

PREFERRED EMBODIMENT

Figure 1:
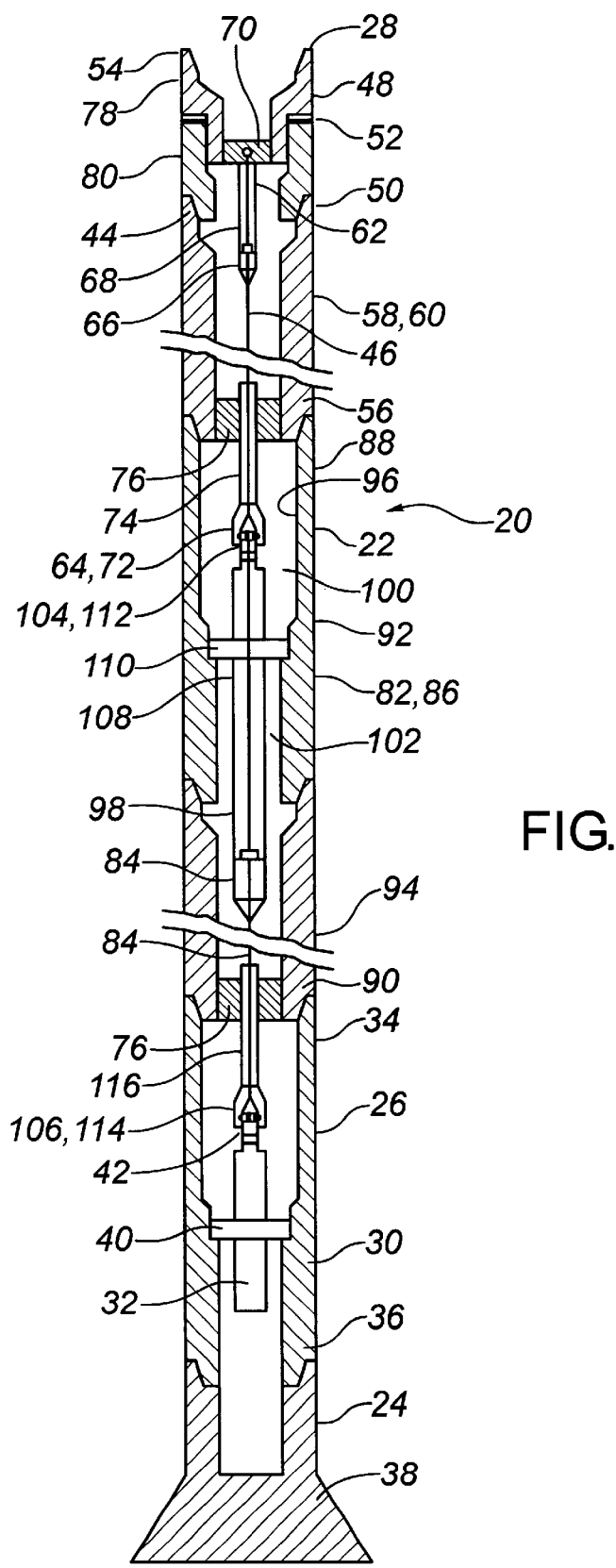
FIG. 1 is longitudinal sectional view of a preferred embodiment of an electromagnetic antenna extension assembly an of the within invention connected into a pipe string.

Referring to FIG. 1, the within invention is directed at an electromagnetic antenna extension assembly (20), comprised of at least one extension tool (22), for connection into a pipe string (24) between a downhole data transmission unit (26) for generating an electromagnetic ("EM") signal and a downhole EM antenna (28) for transmitting the EM signal into the surrounding formation for reception or detection at the ground surface. Although the assembly (20) may be connected into any pipe string where communication of an EM signal is desired, such as any string or multiple joints or sections of pipe interconnected together to extend downhole, the pipe string (24) is comprised of a drill string (24) in the preferred embodiment of the within invention. Further, within invention is directed at a method for connecting the downhole data transmission unit (26) with the downhole EM antenna (28), utilizing the EM antenna extension assembly (20).

The downhole data transmission unit (26) may be any type of tool or downhole transmitter capable of transmitting electromagnetic signals providing data or information, such as telemetry data, to a downhole antenna (28) tool. Preferably, the data transmission unit (26) is of a type comprised of a conductive outer transmission member (30) and an inner data transmission tool (32) therein. The outer transmission member (30) is comprised of a tubular member, sub or sleeve having an upper end (34) and a lower end (36). In the preferred embodiment, the outer transmission member (30) is comprised of an index or hang off sub.

The lower end (36) of the outer transmission member (30) is adapted or configured to be compatible for connection with a lower or downhole portion of the pipe string (24). More particularly, the lower end (36) is connected with equipment comprising the bottom hole assembly. In the preferred embodiment in which the pipe string is a drill string (24), the lower end (36) is connected with a drill bit (38) or other equipment comprising the bottomhole drilling assembly. Although the lower end (36) may be connected with the drill bit (38) by any fastener, connector or mechanism or structure for connecting the adjacent ends thereof, a threaded connection is preferably provided between the drill bit (38) and the lower end (36) of the outer transmission member (30).

Similarly, the upper end (34) of the outer transmission member (30) is adapted or configured to be compatible with the portion of the pipe string (24) typically located uphole or above the data transmission unit (26). For instance, the EM antenna (28) is typically located uphole or above the data transmission unit (26). However, in the within invention, the extension tool (22) is connected with the upper end (34) of the data transmission unit (26) as described further below. In the preferred embodiment, the upper end (34) of the outer transmission member (30) is comprised of a threaded connector, preferably a threaded box or female connector, for connection with the adjacent extension tool (22).

The inner data transmission tool (32) is preferably housed or contained within the outer transmission member (30). The inner data transmission tool (32) is preferably comprised of an EM measurement-while-drilling ("MWD") tool which provides telemetry data or information signals. The EM MWD tool (32) is typically housed or contained within the outer transmission member (30), preferably an index or hang off sub. The EM MWD tool (32) may be held, supported or hung within the index sub (30) by any mechanism or structure suitable for supporting or hanging the EM MWD tool (32) therein such that the position of the EM MWD tool (32) is maintained within the index sub (30). In the preferred embodiment, the EM MWD tool (32) is supported within the index sub (30) by a hang off ring (40) mounted or connected with an inner surface of the index sub (30). The hang off ring (40) also acts as a lower electrode contact ring for the data transmission unit (26).

The inner data transmission tool or EM MWD tool (32) is comprised of an upper electrical connector (42) for electrical connection with the equipment or portion of the pipe string (24) located uphole of the data transmission unit (26). Typically, the upper connector (42) would be configured or adapted to be compatible for connection with the EM antenna (28), however, in the within invention, the upper connector (42) is connected with the extension tool (22) as described further below.

The upper connector (42) of the EM MWD tool (32) is preferably positioned within the index sub (30) such that it is accessible for connection through the upper end (34) of the index sub (30). Any type of upper connector (42) able to provide an electrical connection may be present. However, typically, the upper connector (42) is comprised of a male connector for ease of connection thereto. Further, the male upper connector (42) is preferably comprised of a contact stinger or probe.

The EM antenna (28) is preferably of a type comprised of a conductive outer antenna member (44) and a conductive inner antenna member (46) therein. The outer antenna member (44) is comprised of an upper portion (48) and a lower portion (50) separated by an electrically insulative gap (52). Each of the upper and lower portions (48, 50) is comprised of at least one tubular member, sub or sleeve. Further, the upper portion (48) defines an upper end (54) of the outer antenna member (44) while the lower portion (50) defines a lower end (56) of the outer antenna member (44).

The upper end (54) of the outer antenna member (44) is adapted or configured to be compatible for connection with an upper or uphole portion of the pipe string (24). Similarly, the lower end (56) of the outer antenna member (44) is adapted or configured to be compatible for connection with the portion of the pipe string (24) typically located downhole or below the EM antenna (28). For instance, the data transmission unit (26) is typically located downhole or below the EM antenna (28). However, in the within invention, the extension tool (22) is connected with the lower end (56) of the EM antenna (28) as described further below. In the preferred embodiment, the lower end (56) of the outer antenna member (44) is comprised of a threaded connector, preferably a threaded pin or male connector, for connection with the adjacent extension tool (22).

The method and the extension tool of the within invention permit a new section, segment or length of an inner conductive member, preferably a cable or wireline, to be inserted or connected into the pipe string downhole of the EM antenna. As a result, the length of the string between the EM antenna and the EM MWD tool may be increased, and particularly, the length of the lower electrode of the EM antenna may be increased.

As discussed previously, if desired, the lower portion (50) of the outer antenna member (44) may be comprised of at least one lengthening section (58) to lengthen the lower portion (50) and thus the lower electrode of the EM antenna (28). Preferably, the lengthening section (58) is comprised of one or more sections or lengths of drillpipe or coil tubing. As a result, where desired, a lengthening section (58) may by used to provide a first interval of increased distance or a first extension distance (60), referred to generally as. distance "X". Distance "X" is defined by the length of the lengthening section (58) comprising the lower portion (50) of the outer antenna member (44). The lengthening section (58) may be comprised of one or more sections or lengths of drillpipe or coil tubing as necessary to provide the desired distance "X" (60). In this instance, the lower end (56) of the outer antenna member (44) is defined by the lowermost or downhole end of the lowermost lengthening section (58).

As indicated, the EM antenna (28) is also comprised of an electrically conductive inner antenna member (46), preferably a wireline or cable, hung off or supported within the outer antenna member (44) of the EM antenna and extending downhole. More particularly, the inner antenna member (46) has an upper end (62) and a lower end (64). The upper end (62) of the inner antenna member (46), or EM antenna wireline, is supported or hung within, and electrically connects with, the upper portion (48) of the outer antenna member (44) above the insulative gap (52).

For instance, the upper end (62) of the inner antenna member (46) or antenna wireline may be comprised of a wireline cable head (66) connected with a feed through conductor (68), which is in turn electrically connected with a flow ring (70) electrically conductive above the insulated gap (52) and in connection with the upper portion (48) of the outer antenna member (44).

The lower end (64) of the inner antenna member (46) is adapted or configured to be compatible for connection with an lower or downhole portion of the pipe string (24). For instance, the data transmission unit (26) is typically located downhole or below the EM antenna (28). Thus, the lower end (64) is typically connected with the upper connector (42) of the EM MWD tool (32). However, in the within invention, the extension tool (22) is connected with the lower end (64) of the inner antenna member (46) as described further below.

The lower end (64) of the inner antenna member (46) is preferably comprised of an lower electrical connector (72) for electrical connection with the equipment or portion of the pipe string (24) located downhole of the EM antenna (28). As stated, typically, the lower connector (72) would be configured or adapted to be compatible for connection with the EM MWD tool (32), however, in the within invention, the lower connector (72) is connected with the extension tool (22) as described further below.

The lower connector (72) of the inner antenna member (46) preferably extends from the outer antenna member (44) such that it is accessible for relatively easy connection therewith. Any type of lower electrical connector (72) able to provide an electrical connection may be present. However, typically, the lower connector (72) is comprised of a female connector for connection with the male upper connector (42) of the EM MWD tool (32). Further, the female lower connector (72) is preferably comprised of a collet overshot. As well, the collet overshot may be connected or associated with a sinker bar (74) for facilitating its connection with a compatible upper connector. Finally, the lower end (64) of the inner antenna member (46) may be associated with at least one centralizer (76) for centralizing the inner antenna member (46) within the outer antenna member (44) as it passes therethrough in order to further facilitate the making of a connection with the lower connector (72).

The inner antenna member (46) is preferably insulated so if it contacts the inner surface of the outer antenna member (44) or any other portion of the pipe string (24) it will not short out the electromagnetic signal. In this case, as described above for known antenna extensions, the inner antenna member (46) is comprised of a single section or segment of EM antenna wireline, which extends from its upper end (62) and an electrical connection with the upper portion (48) of the outer antenna member (44) to its lower end (64) comprised of the lower connector (72) or collet overshot. Thus, where a lengthening section (58) is used in the EM antenna (28), the distance "X" (60) will be limited by the permissible length of a single section of wireline or cable, which is dependent upon the borehole inclination as described above.

As a result of the above configuration of the EM antenna (28), the upper portion (48) of the outer antenna member (44) and the uphole part or portion of the pipe string (24) to the surface provide an upper electrode (78) of the EM antenna (28). Further, the lower portion (50) of the outer antenna member (44) and the downhole part or portion of the pipe string (24) to the bit (38) provide a lower electrode (80) of the EM antenna (28).

The EM antenna extension assembly (20), and each extension tool (22), of the within invention may be connected into the pipe string (24) in order to lengthen the lower electrode (80) of the EM antenna (28). The extension tool (22) may be connected with the lower portion (50) of the outer antenna member (44) of the EM antenna (28). In the preferred embodiment as shown in FIG. 1, in order to maximize the possible length of the extension, the extension tool (22) is connected to the lower end (56) of the outer antenna member (44), preferably comprised of at least one lengthening section (58).

The method and the extension tool (22) of the within invention permit a new section, segment or length of an inner conductive member, preferably a cable or wireline, to be inserted or connected into the pipe string (22) downhole of the EM antenna (28). As a result, the length of the pipe string (24) between the EM antenna (28) and the data transmission unit (26) may be increased, and particularly, the length of the lower electrode (80) of the EM antenna (28) may be increased.

The EM antenna extension assembly (20) is comprised of at least one extension tool (22). Each extension tool (22) is comprised of an electrically conductive outer extension member (82) and an electrically conductive inner extension member (84) mounted and extending within the outer extension member (82). The extension tool (22) is connected between the data transmission unit (26) and the EM antenna (28) such that an electromagnetic signal is communicable therebetween. Further, the outer extension member (82) is preferably electrically insulated from the inner extension member (84).

The extension tool (22) allows a new, further section or segment of wireline or cable or other conductive inner extension member (84), to be placed or connected downhole of the first section or segment of the conductive inner antenna member (46). As a result, the extension tool (22) provides a second interval of increased distance or a second extension distance (86), referred to generally as distance "Y". Distance "Y" (86) is defined by the length of the outer extension member (82) of the extension tool (22).

As discussed, in the event that a further extension of the EM antenna (28) is desired, two or more extension tools (22) may be connected together. In this case, each extension tool (22) will provide a new, further section or segment of wireline, cable or other conductive inner extension member (84) to be placed or connected in series downhole of the previous section or segment of wireline, cable or inner extension member (84) from the previous extension tool (22). As a result, the length of the lower electrode (80) of the EM antenna (28) may be extended by any further number of desired intervals of distance or extension distances (86). In effect, distance "Y" (86) is defined by the sum of the lengths of each outer extension member (82) of each extension tool (22) comprising the antenna extension assembly (20).

FIG. 1 shows the preferred embodiment of the extension tool (22) of the within invention. More particularly, FIG. 1 shows a single preferred extension tool (22) connected into the pipe string (24) between the EM antenna (28) and the data transmission unit (26).

In the preferred embodiment, as discussed above, the extension tool (22) is comprised of the electrically conductive outer extension member (82) having an upper end (88) and a lower end (90). Further, although the outer extension member (82) may be comprised of a single unitary element or member, the outer extension member (82) is preferably comprised of a top section (92) and a bottom section (94) connected together in series. The top section (92) defines the upper end (88) of the outer extension member (82), while the bottom section (94) defines the lower end (90) of the outer extension member (82). Further, each of the top and bottom sections (92, 94) is comprised of at least one tubular member, sub or sleeve.

Although the top and bottom sections (92, 94) may be comprised of any electrically conductive material, each of the top and bottom sections (92, 94) is preferably comprised of at least one length of pipe, such as drill pipe, or at least one length of coiled tubing. In the preferred embodiment, the length of distance "Y" (86) is varied by primarily varying the length of the bottom section (94), which may be varied by increasing the length of individual lengths or sections of pipe or coiled tubing or by increasing the number of lengths, joints or sections of pipe or coiled tubing comprising the bottom section (94). The top and bottom sections (92, 94) and the lengths of pipe or coiled tubing comprising each section (92, 94) may be connected, attached or affixed in series in any manner. However, preferably, a threaded connection is provided therebetween.

The upper end (88) of the outer extension member (82) is adapted or configured to be compatible for connection with the outer antenna member (44), particularly its lower end (56). In addition, in order that the electromagnetic antenna extension assembly (20) may be comprised of two or more extension tools (22) connected in series, the upper end (88) of the outer extension member (82) is further connectable with the lower end (90) of an adjacent or second outer extension member (82). In the preferred embodiment, the upper end (88) of the outer extension member (82) is comprised of a threaded connector, preferably a threaded box or female connector. Thus, the extension tool (22) provides a threaded box connector at the upper end (88) of the outer extension member (82) for electrical connection with a threaded pin connector at the lower end (56) of the outer antenna member (44).

Thus, the upper end (88) of the electrically conductive outer extension member (82) may be connected with the outer antenna member (44), and preferably a lengthening section (58) connected thereto, in a manner and by a structure such that the extension tool (22) forms a portion of the lower electrode (80) of the EM antenna (28).

The lower end (90) of the outer extension member (82) is adapted or configured to be compatible for connection with the outer transmission member (30), particularly its upper end (34). In addition, in order that the electromagnetic antenna extension assembly (20) may be comprised of two or more extension tools (22) connected in series, the lower end (90) of the outer extension member (82) is further connectable with the upper end (88) of an adjacent or second outer extension member (82). In the preferred embodiment, the lower end (90) of the outer extension member (82) is comprised of a threaded connector, preferably a threaded pin or male connector. Thus, the extension tool (22) provides a threaded pin connector at the lower end (90) of the outer extension member (82) for electrical connection with a threaded box connector at the upper end (34) of the outer transmission member (30). Further, where greater than one extension tool (22) comprises the antenna extension assembly (20), a second extension tool (22) provides a threaded pin connector at the lower end (90) of the outer extension member (82) for electrical connection with a threaded box connector at the upper end (88) of the outer extension member (82) of the adjacent first extension tool (22).

As indicated, the outer extension member (82) is preferably electrically insulated from the inner extension member (84). More particularly, the outer extension member (82) has an inner surface (96) and the inner extension member (84) has an outer surface (98). The inner surface (96) is preferably a spaced distance from the outer surface (98) to provide an electrically insulative gap or space (100) therebetween. In addition, an insulator (102) is preferably provided between the inner surface (96) of the outer extension member (82) and the outer surface (98) of the inner extension member (84) for further electrically insulating the outer extension member (82) from the inner extension member (84). The insulator (102) is preferably associated, mounted or connected with one or both of the inner and outer surfaces (96, 98). In the preferred embodiment, the insulator (102) is comprised of an insulative coating associated with the outer surface (98) of the inner extension member (84).

Further, in the preferred embodiment, the insulated electrically conductive inner extension member (84) extends within the outer extension member (82), including the top section (92) and the bottom section (94). The inner extension member (84) is preferably comprised of a single length of wireline or cable, but may also be comprised of a length of coiled tubing. In the preferred embodiment, the inner extension member (84) is comprised of a single length of wireline having an insulative coating (102) on the outer surface (98) thereof. The inner extension member (84) has an upper end (104) and a lower end (106).

The inner extension member (84) is mounted, connected or otherwise affixed within the inner surface (96) of the outer extension member (82) while electrically insulating the signal path of the inner extension member (84) from the outer extension member (82). In the preferred embodiment, the inner extension member (84) is mounted, connected or held within the top section (92) of the outer extension member (82) More particularly, in the preferred embodiment, the upper end (104) of the inner extension member (84) is comprised of a feed through conductor (108) which is supported, hung or retained in position within the outer extension member (82) by a hang off ring (110) such that the position of the feed through conductor (108), and thus the inner extension member (84), is-maintained within the top section (92).

Further, the upper end (104) of the inner extension member (84) is adapted or configured to be compatible for connection with the inner antenna member (46), particularly the lower connector (72). The upper end (104) of the inner extension member (84) is preferably comprised of an upper electrical connector (112) or fastener compatible with the lower connector (72) of the inner antenna member (46) of the EM antenna (28) for connection therewith. In addition, in order that the electromagnetic antenna extension assembly (20) may be comprised of two or more extension tools (22) connected in series, the upper connector (112) of the inner extension member (84) is further connectable with the lower end (106) of an adjacent or second inner extension member (84). In the preferred embodiment, the upper connector (112) is comprised of a male connector. Further, the male upper connector (112) is preferably comprised of a contact stinger or probe.

The lower end (106) of the inner extension member (84) is adapted or configured to be compatible for connection with the upper connector (42) of the inner data transmission (32). More particularly, the lower end (106) of the inner extension member (84) is preferably comprised of a lower electrical connector (114) compatible with the upper connector (42) of the inner data transmission tool (32).

The lower connector (114) of the inner extension member (84) preferably extends from the outer extension member (82) such that it is accessible for relatively easy connection therewith. In the preferred embodiment, the lower connector (114) is comprised of a female connector for connection with the male upper connector (42) of the EM MWD tool (32). Further, the female lower connector (114) is preferably comprised of a collet overshot. As well, the collet overshot may be connected or associated with a sinker bar (116) for facilitating its connection with a compatible upper connector. Finally, the lower end (106) of the inner extension member (84) may be associated with at least one centralizer (76) for centralizing the inner extension member (84) within the outer extension member (82) as it passes therethrough in order to further facilitate the making of a connection with the lower connector (114).

As stated, the lower end (106) of the inner extension member (84) is adapted or configured to be compatible for connection with the inner data transmission tool (32), particularly its upper connector (42). In addition, in order that the electromagnetic antenna extension assembly (20) may be comprised of two or more extension tools (22) connected in series, the lower end (106) of the inner extension member (84) is further connectable with the upper end (104) of an adjacent or second inner extension member (84).

Thus, in the preferred embodiment, the lower connector (114) of the inner extension member (84) is comprised of a female connector, being a collet overshot. The collet overshot is used to hold an electrical contact in place while drilling which provides continuity of signal at the connection point. The lower connector (114) of the inner extension member (84) provides an electrical connector compatible with the upper connector (42) of the inner data transmission tool (32), being a contact stinger or probe, and further compatible with the upper connector (112) of the inner extension member (84) of a further or second extension tool (22), also being a contact stinger or probe.

As discussed above, where a single extension tool (22) is used, the length of the conductive inner extension member (84), extending between the upper connector (112) or contact stinger at its upper end (104) and the lower connector (114) or collet overshot at its lower end (106), is selected such that the inner extension member (84) is connectable to the lower connector (72) of the inner antenna member (46) and the upper connector (42) of the EM MWD tool (32). Thus, the conductive inner extension member (84) extends for substantially the entire length of the outer extension member (82) of the extension tool (22).

However, the inclination of the borehole will limit the usable length of a single section of the wireline or cable comprising the conductive inner extension member (84), and will thus limit the length of the outer extension member (82) and the extension tool (22). More particularly, the sinker bar (116) will not pull the wireline (84) further down the borehole typically above inclinations of about 60°. In this instance, one may attempt to pump the sinker bar (116) further downhole using fluid inside the drillpipe in conjunction with a circulating head on surface to push the collet overshot (114) and sinker bar (116) further down to the connection point, thus extending the length of the segment. Alternately, two or more extension tools (22) may be connected together in series to provide the desired length of the extension.

For example, when using greater than one extension tool (22), the upper end (88) of the outer extension member (82) of one extension tool (22) is connected with the lower end (56) of the lengthening section (58) connected with the lower portion (50) of the EM antenna (28). The lower end (90) of the outer extension member (82) of the extension tool (22) is connected with the upper end (88) of the outer extension member (82) of a further extension tool (22). The lower end (90) of the outer extension member (82) of the further extension tool (22) is connected with the upper end (54) of the outer antenna member (44).

With respect to the wireline or inner extension member (84), the collet overshot (114) at the lower end (72) of the inner antenna member (46) is connected with the contact stinger (112) at the upper end (104) of the conductive inner extension member (88) of one extension tool (22). The collet overshot (114) at the lower end (106) of the inner extension member (84) is connected with the contact stinger (112) at the upper end (104) of the inner extension member (84) of the further extension tool (22). Finally, the collet overshot (114) at the lower end (106) of the inner extension member (84) of the further extension tool (22) is connected with the contact stinger (42) of the inner data transmission tool or EM MWD tool (32).

The method of the within invention may be comprised of any steps for connecting the data transmission unit (26) with the EM antenna (28) such that the lower electrode (80) of the EM antenna (28) is extended thereby. Further, the method may be comprised of any steps for connecting the EM antenna extension assembly (20), including at least one extension tool (22), into the pipe string (24) between the EM antenna (28) and the data transmission unit (26) and inserting the pipe string (24), along with the extension tool (22), into the borehole such that the EM antenna (28) is positioned in the desired location within the borehole.

Preferably, the method is comprised of inserting or tripping the index sub (30), including the EM MWD tool (32), into the borehole using the bottom section (94) of the outer extension member (82) of an extension tool (22). Referring to FIG. 1, one or more lengths of drillpipe or coil tubing comprising the bottom section (94) of the outer extension member (82) are connected in series to the upper end (34) of the index sub (30) in order to insert or trip the EM MWD tool (32) into the borehole. The EM MWD tool (32) is inserted or tripped down the borehole as far as reasonably possible. However, the specific location of the EM MWD tool (32) or its depth beneath the surface will be dependent upon the borehole angle and inclination and the ability of the collet overshot (114) at the lower end (106) of the inner extension member (84) of the extension tool (22) to subsequently slide along the low side of the pipe, such as the drill pipe, which comprises the bottom section (94) of the outer extension member (82) of the extension tool (22), and stab into the wet connect or contact stinger (42) on top of the EM MWD tool (32). More particularly, to facilitate the subsequent connection between the collet overshot (114) and the contact stringer (42), the borehole at the location at which this connection is to occur preferably has a borehole inclination of less than 60°.

Once the EM MWD tool (32) is tripped into the borehole as far as reasonably possible, the top section (92) of the outer extension member (82) is screwed onto or otherwise connected with the uppermost end of the drillpipe or coil tubing which comprises the bottom section (94). As described above, an insulated feed through conductor (108) is contained within the top section (92), preferably in about the centre of the top section (92), which feed through conductor (108) mechanically hangs off or supports the lower wireline segment or inner extension member (84) below it. As a result, the wireline which comprises the inner extension member (84) of the extension tool (22) is lowered within the drillpipe or coil tubing (82) until the collet overshot (114) at the lower end (106) of the wireline (84) connects with the contact stinger (42) of the EM MWD tool (32).

One or more lengths of drillpipe or coil tubing comprising the lengthening section (58), and defining distance "X" (60), are then connected to the upper end (88) of the top section (92) of the outer extension member (82) in order to further insert or trip the EM MWD tool (32) into the borehole. Further lengths of pipe or coil tubing (58) are added until either the drill bit (38) gets to the bottom of the borehole or the top section (92) reaches a predetermined angle or desired depth. Again, preferably, the borehole at the location at which the top section (92) is located has a borehole inclination of less than 60° in order to have enough weight from the sinker bar (116) to allow the subsequent connection between the contact stinger (112) at the upper end (104) of the inner extension member (84) of the extension tool (22) and the collet overshot (72) at the lower end (64) of the inner antenna member (44).

At this point if the telemetry attenuation is acceptable for the signal over the interval to be drilled, the inner antenna member (46) or EM antenna wireline is inserted through the lengthening section (58) for connection with the upper end (104) of the conductive inner extension member (84) of the extension tool (22). Specifically, the collet overshot (72) of the EM antenna wireline (46) connects with the contact stinger (112) at the upper end (104) of the conductive inner extension member (84). The wireline cable head (66) at the upper end (62) of the inner antenna member (46) or EM antenna wireline is connected to the feed through conductor (68) in the outer antenna member (44).

Then, the remainder or balance of the outer antenna member (44), including the upper portion (48) and the section of the lower portion (50) uphole of the lengthening section (58), is connected at the uppermost end of the drillpipe or coil tubing which comprises the lengthening section (58). The insulated feed through conductor (68) is supported within the outer antenna member (44) such that the upper end (62) of the inner antenna member (46) connects with the upper portion (48) of the outer antenna member (44). More particularly, the inner antenna member (46) is supported within the outer antenna member (44) by hanging it off the upper portion (48) which is electrically insulated from the lower portion (50) comprising the lower electrode. This completes the lower electrode (80) of the EM antenna (28) and starts the upper electrode (78) of the EM antenna (28) in the pipe string (24) at the insulated gap boundary (52).

Alternatively, if the depth is not acceptable for the attenuation profile of the segment to be drilled, the process is repeated by installing a second outer extension member (82) of a second or further extension tool (22) instead of the outer antenna member (44). More particularly, sections of drillpipe or coil tubing are installed comprising the bottom section (94) of the outer extension member (82) of the second or further extension tool (22). The method as described above is then repeated for the second extension tool (22).

For instance, the inner extension member (84) of the second extension tool (22), which is mechanically hung from the top section (92), is inserted within the bottom section (94) and lowered until the lower connector (114) or collet overshot of the inner extension member (84) of the second extension tool (22) is connected with the upper connector (112) or contact stinger or probe of the inner extension member (84) of the first extension tool (22). The top section (92) of the outer extension member (82) of the second extension tool (22) is then screwed onto or otherwise connected with the uppermost end of the drillpipe or coil tubing which comprises the bottom section (94) of the outer extension member (82) of the second extension tool (22), in the same manner as described above for the first extension tool (22).

In the event that further extension is desired or required, any number of further extension tools (22) may be similarly connected with the second extension tool (22) to achieve the desired length of distance "Y" (86). Specifically, the lower end (90) of the outer extension member (82) of any desired further second extension tool (22) is connected in series with the upper end (88) of the outer extension member (82) of the prior or second downhole extension tool (22) located downhole therefrom. Further, the inner extension member (84) of the further second extension tool (22) is inserted within the outer extension member (82) of the further second extension tool (22) and lowered until the lower connector (114) of the inner extension member (84) of the further second extension tool (22) is connected with the upper connector (112) of the inner extension member (84) of the prior or previous second extension tool (22) located downhole therefrom. The top section (92) of the outer extension member (82) of the further second extension tool (22) is then screwed onto or otherwise connected with the bottom section (94) of the outer extension member (82) of the further second extension tool (22), in the same manner as described above.

Once the desired extension is achieved, the outer antenna member (44) of the EM antenna (28) is connected with the upper end (88) of the outer extension member (82) of the second extension tool (22) or the uppermost or most uphole further second extension tool (22). The inner antenna member (46) is then inserted within the outer antenna member (44) and lowered until the lower connector (72) of the inner antenna member (46) is connected with the upper connector (112) of the inner extension member (84) of the second extension tool (22) or the uppermost or most uphole further second extension tool (22).

Figure 2:
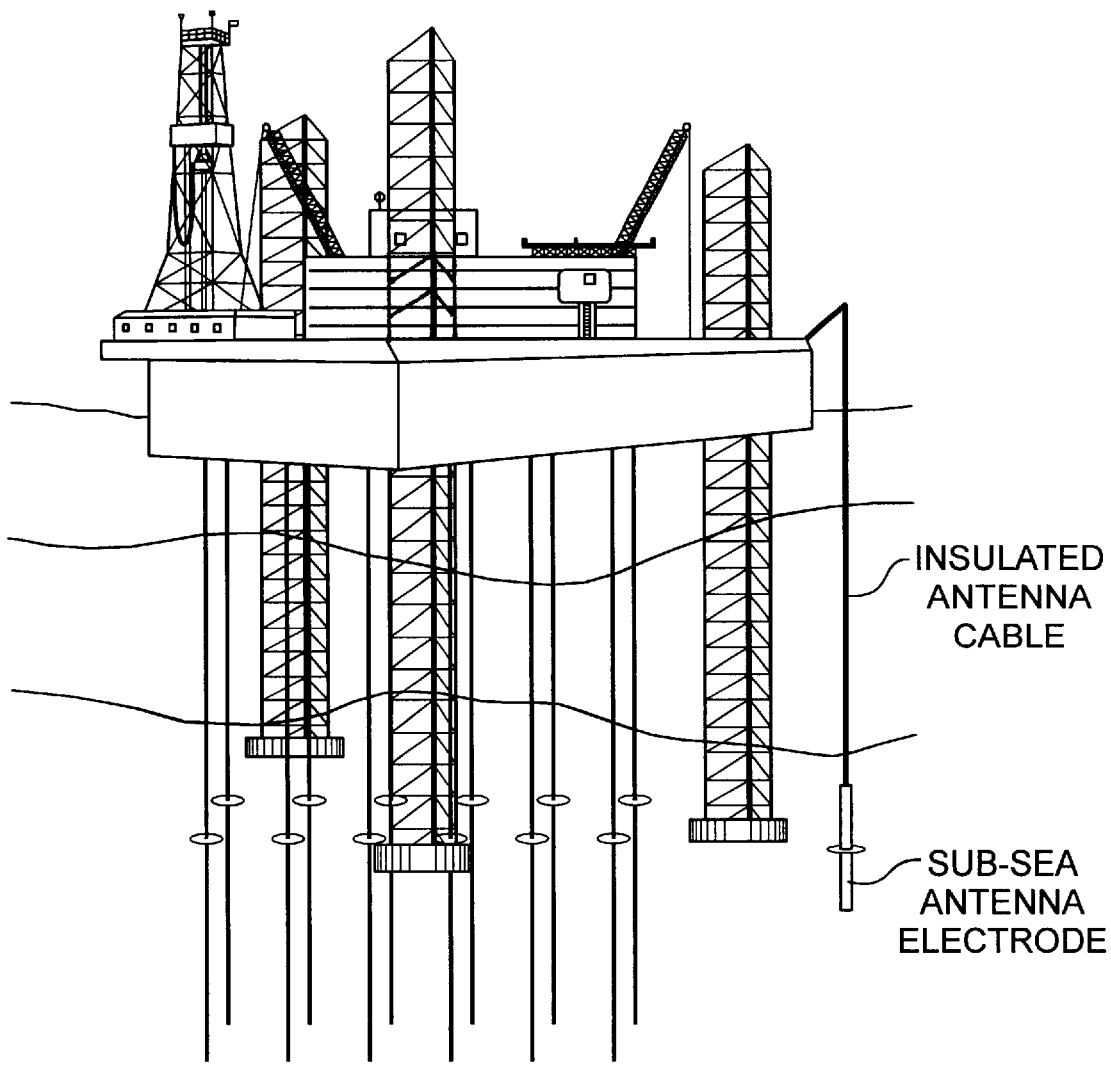
FIG. 2 is a pictorial showing the preferred location of an EM antenna in a subsea drilling application.

What this method allows for is the launch point of the EM signal to be started very close to surface even though it may be inside casing or a casing string. Typically, the attenuation from the casing is about 20 dB in signal strength. However, the distance drilled to drill the underbalanced zone is usually only about 1000 m or less, within the capabilities of a single hop communication link, thereby allowing for the underbalanced zone to be drilled reliably. Preferably, the objective would be to start the EM signal at a depth just under the sub sea blow out preventer, as shown in FIG. 2, or on a land job below the blow out preventer. Since the attenuation is relatively low at this shallow depth, one can use a relatively small signal at a high data rate, which results in a relatively low power consumption and longer battery life, thus maximizing the depth that one can drill.

The within invention may move the signal launch point relatively close to the surface using as many extension tools (22) as needed to allow the drill bit (38) to reach the heel of the underbalanced zone. This may also allow the signal to hop over previously insurmountable formation zones of anhydrates and other highly resistive zones that attenuate the propagating electromagnetic wave that would normally travel in the formation and on the drillpipe to the point that it is no longer possible to propagate a signal to surface that can be adequately detected. For instance, these circumstances are typically encountered in the southern North Sea area where huge gas fields exist but must be drilled underbalanced where conventional or traditional EM MWD can not operate at measured depths of 14,000 to 17,000 feet or more. This is because the casing point is set deeper than a single leg of electromagnetic wave transmission can be accomplished without the aid of a repeater or enormous transmission power, which is not typically available in a downhole tool and which may not be practical to implement.

As discussed above, an alternate variation of this invention is to run insulated coil tubing as the conductive inner extension member (84) inside the drillpipe comprising the outer extension member (82). Since the drilling operation may call for 2 phase flow or nitrogen, the requirement for the larger flow area such as the inner diameter of a standard drillpipe can be tolerated by using the coil tubing wall inside the drillpipe to act as the conductive inner extension member (84). Other types of insulated wire can be also used or one can coat the inside of the drillpipe comprising the outer extension ember (82) with an insulated coating and run a bare uninsulated wire down the center of the drillpipe.

Yet another variant would be to run a coil tubing first with a center wire in it connected to the EM MWD tool (32), then connect on top of it either a top section (92) of the outer extension member (82) and stack on yet another segment of coil tubing or finish it by hooking up an outer antenna member (44) which connects the center wire of the coil tubing to the upper portion (48) of the outer antenna member (44). After that ordinary drillpipe is used as again the signal launch point is close to the surface. This method may be particularly applicable in 6" and ¾" hole sizes.

All these methods move the EM signal close to the surface without having to run a wire at every connection as is the case with a steering tool. By positioning the signal launch point close to the surface, only the resistances of the two electrical conductors, such as the wireline and drillpipe electrical resistances, affect the signal strength, which is considerably far less than the formation resistances encountered in the typical earth mode drillstring telemetry method that exists above the EM antenna (28). This phenomena is the reason coaxial cable is commonly used to propagate electromagnetic waves over great distances with very little loss. All the same key advantages of a coaxial cable are implemented with this invention to place the signal launch point into the formation close to the surface.

Should the EM signal start to get out of range one could either place a repeater and EM antenna (28) into the pipe string (24) so as not have to trip out of the borehole to the EM antenna (28) or trip back out of the borehole to the EM antenna (28) and replace it with another extension tool (22) and move the antenna (28) back up closer to the surface again. If the extension tool (22) is to replace the EM antenna (28) typically used as a means to extend the drilling depth, then one would replace the conventional outer antenna member (44) with the outer extension member (82) of the extension tool (22), then trip back in the borehole lengthening the lower electrode (80). Another wireline segment, being the inner antenna member (46), would then be run to connect its lower end (64) to the top or upper end (104) of the inner extension member (84) of the extension tool (22) and to connect its upper end (62) to the feed through conductor (68) in the EM antenna (28) which is now moved further up in the pipe string (24). Typically these segments while drilling will be shorter as a result of dealing with the limitation of attenuation inside casing versus depth which is much higher rather than the limitation of the ability to slide the wet connect to stab into the extension tool (22) at borehole inclinations that are approaching 60°.

The embodiments of the invention in which an exclusive property or privilege is claimed are defined as follows:

1. An electromagnetic antenna extension assembly for connection into a pipe string between a downhole data transmission unit for generating an electromagnetic signal and a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the electromagnetic antenna extension assembly comprising at least one extension tool comprised of:

(a) an electrically conductive outer extension member having an upper end connectable with the outer antenna member and a lower end connectable with the outer transmission member; and (b) an electrically conductive inner extension member mounted and extending within the outer extension member and having an upper end connectable with the lower connector of the inner antenna member and a lower end connectable with the upper connector of the inner data transmission tool;

such that the electromagnetic signal is communicable between the downhole data transmission unit and the downhole electromagnetic antenna.

2. The electromagnetic antenna extension assembly as claimed in claim 1 wherein the outer extension member is electrically insulated from the inner extension member.

3. The electromagnetic antenna extension assembly as claimed in claim 2 wherein the outer extension member has an inner surface, wherein the inner extension member has an outer surface and wherein the inner surface is a spaced distance from the outer surface to provide an electrically insulative gap therebetween.

4. The electromagnetic antenna extension assembly as claimed in claim 2 wherein the outer extension member has an inner surface, wherein the inner extension member has an outer surface and wherein the extension tool is further comprised of an insulator between the inner surface and the outer surface for electrically insulating the outer extension member from the inner extension member.

5. The electromagnetic antenna extension assembly as claimed in claim 4 wherein the insulator is comprised of an insulative coating associated with at least one of the outer surface of the inner extension member and the inner surface of the outer extension member.

6. The electromagnetic antenna extension assembly as claimed in claim 5 wherein the outer surface of the inner extension member is comprised of the insulative coating.

7. The electromagnetic antenna extension assembly as claimed in claim 5 wherein the inner surface of the outer extension member is comprised of the insulative coating.

8. The electromagnetic antenna extension assembly as claimed in claim 2 wherein the upper end of the inner extension member is comprised of an upper electrical connector compatible with the lower connector of the inner antenna member for connection therewith.

9. The electromagnetic antenna extension assembly as claimed in claim 8 wherein the lower end of the inner extension member is comprised of a lower electrical connector compatible with the upper connector of the inner data transmission tool for connection therewith.

10. The electromagnetic antenna extension assembly as claimed in claim 9 wherein each of the lower connector of the inner antenna member and the lower connector of the inner extension member is comprised of a female connector and wherein each of the upper connector of the inner extension member and the upper connector of the inner data transmission tool is comprised of a compatible male connector for insertion in the female connector.

11. The electromagnetic antenna extension assembly as claimed in claim 2 wherein the assembly is comprised of at least two extension tools connected in series, wherein the lower end of the outer extension member is further connectable with the upper end of an adjacent outer extension member and wherein the lower end of the inner extension member is further connectable with the upper end of an adjacent inner extension member such that the electromagnetic signal is communicable between the downhole data transmission unit and the downhole electromagnetic antenna.

12. The electromagnetic antenna extension assembly as claimed in claim 11 wherein the lower end of the inner extension member is comprised of a lower electrical connector compatible for connection with the upper connector of the inner data transmission tool and the upper end of an adjacent inner extension member.

13. The electromagnetic antenna extension assembly as claimed in claim 12 wherein the upper end of the inner extension member is comprised of an upper electrical connector compatible for connection with the lower connector of the inner antenna member and the lower connector of an adjacent inner extension member.

14. The electromagnetic antenna extension assembly as claimed in claim 13 wherein each of the lower connector of the inner antenna member and the lower connector of the inner extension member is comprised of a female connector and wherein each of the upper connector of the inner extension member and the upper connector of the inner data transmission tool is comprised of a compatible male connector for insertion in the female connector.

15. The electromagnetic antenna extension assembly as claimed in claim 2 wherein the inner extension member is comprised of a wireline, a length of coiled tubing or at least one length of pipe.

16. The electromagnetic antenna extension assembly as claimed in claim 5 wherein the inner extension member is comprised of a wireline having an insulative coating on the outer surface thereof.

17. The electromagnetic antenna extension assembly as claimed in claim 15 wherein the outer extension member is comprised of at least one length of pipe or at least one length of coiled tubing.

18. The electromagnetic antenna extension assembly as claimed in claim 17 wherein the extension tool is further comprised of at least one centralizer associated with the inner extension member for centralizing the inner extension member within the outer extension member.

19. The electromagnetic antenna extension assembly as claimed in claim 18 wherein at least one centralizer is associated with the lower end of the inner extension member.

20. The electromagnetic antenna extension assembly as claimed in claim 17 wherein the outer extension member is comprised of a top section defining the upper end of the outer extension member connected with a bottom section defining the lower end of the outer extension member, wherein each of the top section and the bottom section is comprised of at least one length of pipe or at least one length of coiled tubing.

21. The electromagnetic antenna extension assembly as claimed in claim 20 wherein the upper end of the inner extension member is mounted within the top section of the outer extension member.

22. A method for connecting a downhole data transmission unit for generating an electromagnetic signal with a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the method comprising the steps of:

(a) providing an electromagnetic antenna extension assembly comprising at least one extension tool, wherein the extension tool is comprised of an electrically conductive outer extension member having an upper end and a lower end and an electrically conductive inner extension member having an upper electrical connector and a lower electrical connector;

(b) connecting the lower end of the outer extension member with the outer transmission member;

(c) inserting the inner extension member within the outer extension member such that the lower connector of the inner extension member is connected with the upper connector of the inner data transmission tool;

(d) connecting the outer antenna member with the upper end of the outer extension member;

(e) inserting the inner antenna member within the outer antenna member such that the lower connector of the inner antenna member is connected with the upper connector of the inner extension member and such that the electromagnetic signal is communicable between the downhole data transmission unit and the downhole electromagnetic antenna.

23. The method as claimed in claim 22 wherein the outer extension member of the extension tool is comprised of a top section defining the upper end of the outer extension member and a bottom section defining the lower end of the outer extension member and wherein the upper connector of the inner extension member is mounted within the top section.

24. The method as claimed in claim 23 wherein step (b) of the method is comprised of connecting the bottom section defining the lower end with the outer transmission member and wherein step (c) of the method is comprised of inserting the inner extension member within the bottom section of the outer extension member such that the lower connector of the inner extension member is connected with the upper connector of the inner data transmission tool and connecting the top section with the bottom section of the outer extension member.

25. The method as claimed in claim 24 wherein the bottom section of the outer extension member is comprised of greater than one length of pipe or coiled tubing and wherein step (b) of the method is further comprised of connecting each length of pipe or coiled tubing in series to provide the bottom section.

26. A method for connecting a downhole data transmission unit for generating an electromagnetic signal with a downhole electromagnetic antenna for transmitting the electromagnetic signal, wherein the downhole electromagnetic antenna is of a type comprising a conductive outer antenna member and a conductive inner antenna member therein having a lower electrical connector and wherein the downhole data transmission unit is of a type comprising a conductive outer transmission member and an inner data transmission tool therein having an upper electrical connector connectable with the lower connector of the inner antenna member, the method comprising the steps of:

(a) providing an electromagnetic antenna extension assembly comprising a first extension tool and at least one second extension tool, wherein each extension tool is comprised of an electrically conductive outer extension member having an upper end and a lower end and an electrically conductive inner extension member having an upper electrical connector and a lower electrical connector;

(b) connecting the lower end of the outer extension member of the first extension tool with the outer transmission member;

(c) inserting the inner extension member of the first extension tool within the outer extension member of the first extension tool such that the lower connector of the inner extension member of the first extension tool is connected with the upper connector of the inner data transmission tool;

(d) connecting the lower end of the outer extension member of the second extension tool with the upper end of the outer extension member of the first extension tool;

(e) inserting the inner extension member of the second extension tool within the outer extension member of the second extension tool such that the lower connector of the inner extension member of the second extension tool is connected with the upper connector of the inner extension member of the first extension tool;

(f) connecting the outer antenna member with the upper end of the outer extension member of the second extension tool; and (g) inserting the inner antenna member within the outer antenna member such that the lower connector of the inner antenna member is connected with the upper connector of the inner extension member of the second extension tool and such that the electromagnetic signal is communicable between the downhole data transmission unit and the downhole electromagnetic antenna.

27. The method as claimed in claim 26 further comprising the steps prior to step (f) of:

(h) connecting the lower end of the outer extension member of at least one further second extension tool with the upper end of the outer extension member of the prior second extension tool;

(i) inserting the inner extension member of the further second extension tool within the outer extension member of the further second extension tool such that the lower connector of the inner extension member of the further second extension tool is connected with the upper connector of the inner extension member of the prior second extension tool;

and wherein steps (f) and (g) connect the electromagnetic antenna with the uppermost further second extension tool.

28. The method as claimed in claim 26 wherein the outer extension member of each extension tool is comprised of a top section defining the upper end of the outer extension member and a bottom section defining the lower end of the outer extension member and wherein the upper connector of the inner extension member is mounted within the top section.

29. The method as claimed in claim 28 wherein step (b) of the method is comprised of connecting the bottom section defining the lower end of the outer extension member of the first extension tool with the outer transmission member and wherein step (c) of the method is comprised of inserting the inner extension member of the first extension tool within the bottom section of the outer extension member of the first extension tool such that the lower connector of the inner extension member is connected with the upper connector of the inner data transmission tool and connecting the top section with the bottom section of the outer extension member of the first extension tool.

30. The method as claimed in claim 29 wherein the bottom section of the outer extension member of the first extension tool is comprised of greater than one length of pipe or coiled tubing and wherein step (b) of the method is further comprised of connecting each length of pipe or coiled tubing in series to provide the bottom section.

31. The method as claimed in claim 29 wherein step (d) of the method is comprised of connecting the bottom section defining the lower end of the outer extension member of the second extension tool with the upper end of the outer extension member of the first extension tool and wherein step (e) of the method is comprised of inserting the inner extension member of the second extension tool within the bottom section of the outer extension member of the second extension tool such that the lower connector of the inner extension member of the second tool is connected with the upper connector of the inner extension member of the first extension tool and connecting the top section with the bottom section of the outer extension member of the second extension tool.

32. The method as claimed in claim 31 wherein the bottom section of the outer extension member of the second extension tool is comprised of greater than one length of pipe or coiled tubing and wherein step (d) of the method is further comprised of connecting each length of pipe or coiled tubing in series to provide the bottom section.

\* \* \* \* \*

UNITED STATES PATENT AND TRADEMARK OFFICE
CERTIFICATE OF CORRECTION

PATENT NO. : 6,531,871 B1
DATED : March 11, 2003
INVENTOR(S) : Richard Thomas Hay and Byron John Sand It is certified that error appears in the above-identified patent and that said Letters Patent is hereby corrected as shown below:

Column 22,
Line 32, delete "3/4" and insert -- 4-3/4 --.

Signed and Sealed this

Nineteenth Day of August, 2003

JAMES E. ROGAN
*Director of the United States Patent and Trademark Office*